A. G. BARTLETT.
Seed-Planter.
No. 5,992.　　　　　　　　　　　　　　　　Patented Mar. 10, 1849
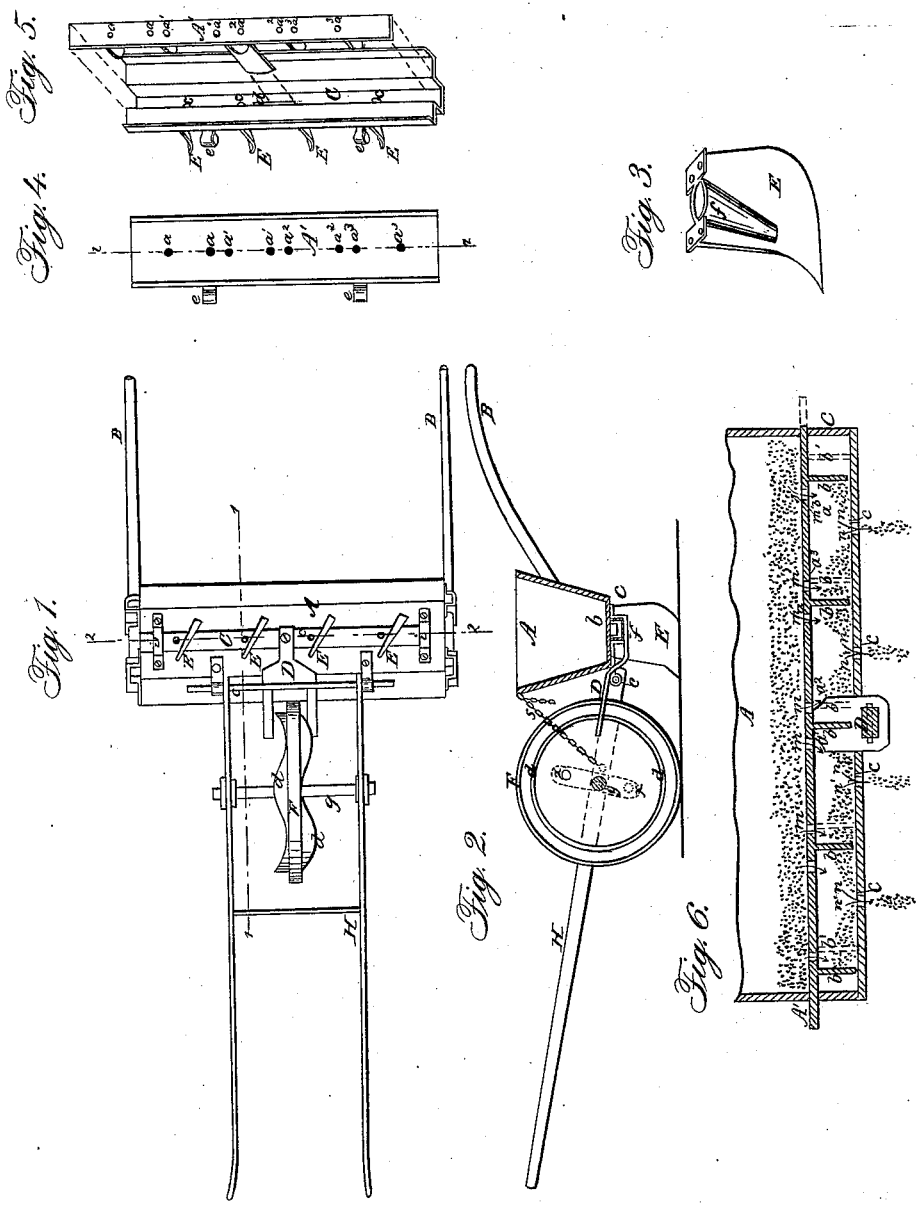

UNITED STATES PATENT OFFICE.

ALBERT G. BARTLETT, OF OXFORD, OHIO.

IMPROVEMENT IN GRAIN-DRILLS.

Specification forming part of Letters Patent No. 5,992, dated March 10, 1849.

*To all whom it may concern:*

Be it known that I, ALBERT G. BARTLETT, of Oxford, in the county of Butler and State of Ohio, have invented certain new and useful Improvements in Machines for Sowing or Planting Seed in Drills, of which the following is a full, clear, and exact description, reference being had to the annexed drawings of the same, making part of this specification, of which—

Figure 1 is a bottom view. Fig. 2 is a vertical longitudinal section through the line 1 1 of Fig. 1. Fig. 3 is a perspective view of one of the teeth. Fig. 4 is a top view of the bottom of the hopper, showing the arrangement of the apertures for discharging the seed. Fig. 5 is a perspective view of a modified form of the bottom of the hopper and of the discharger, the latter being raised out of its place. Fig. 6 is a vertical section taken longitudinally through the hopper and discharger.

The same letters indicate the same parts in all the figures.

Husbandmen have heretofore, and do yet, consider it a desideratum to procure a seed-drill at once simple, durable, and cheap, not liable to get out of order, and which will sow and effectually cover the seed in a regular and uniform manner without clipping, crushing, or otherwise injuring it. These objects, so desirable, are, as I believe, fully accomplished in this invention. All drills heretofore devised sufficiently simple in their structure to come into general use have been made so as to discharge the seed from the hopper through apertures alternately opened and closed by means of a slide, perforated cylinder, or other equivalent device; but an insuperable objection to all machines constructed upon this principle exists in the fact that many of the seeds are injured and their germinal properties destroyed by being bruised, brushed, and sometimes even clipped in two between the slides and the sides of the discharging-apertures.

To obviate this grand defect in a class of drills which in other respects are perhaps preferable to all others is one of the main objects of my present invention, and which is completely attained by causing the seed to pass from the hopper into the drills $f$, made by the teeth, through passages which are constantly open, and which are so formed and arranged that the seed will not pass through them unless the machine be in motion, nor will they pass through too rapidly. The seed dropped in the furrow made by one tooth is covered by the soil turned over by the adjacent tooth.

To enable others skilled in the art to make and use my invention, I will proceed to describe its construction and operation.

A is the hopper to contain the seed to be sown. It may be made of such form, size, and material as may be deemed most suitable and convenient, being provided with a lid and fastenings to secure the same, to preserve the seed from accidental admixture with impurities, to keep it dry, and to prevent its being spilled.

The handles B B are secured to the hopper in any suitable manner. They are for the purpose of raising or depressing the teeth and guiding the machine.

Through the bottom of the hopper any number of holes, $a\ a,\ a'\ a',\ a^2\ a^2,\ a^3\ a^3$, Figs. 4, 5, and 6, are made, and are arranged in pairs, as represented, one pair for each tooth of the machine. Through these holes alternately the discharger is supplied with seed from the hopper. On the under side of the bottom the pushers or stops $b\ b\ b\ b\ b$ are placed, one between each of the pairs of holes $a$ and one on each end of the bottom outside of the holes. These stops are placed within the discharging-trough C, and divide it into separate compartments. The discharging-trough C, in the manner in which it is arranged in Figs. 1, 2, and 4, is movable, being vibrated in the direction of its length, and the stops $b$ within it are fixed; but as represented in Figs. 5 and 6 the trough is fixed, and the stops or pushers $b$ move backward and forward within it, that part of the bottom A', Figs. 5 and 6, to which the studs are affixed being also movable. The trough has half as many discharging-holes $c\ c\ c\ c$ as there are in the bottom of the hopper, one of which is placed in the center of each compartment. The relative position and number of these holes may be varied in such cases, as the constructor may deem it expedient, in order to adapt the machine better for sowing some particular kind of seed, or for other reasons. The trough C slides on the loops $i$ $i$, Figs. 1 and 2, which also hold it up against the bottom of the hopper; but it may be held in its place by any other means more suitable or convenient.

To the middle of the trough the forked arm D, Figs. 1 and 2, is firmly secured. This arm projects forward, so that one end of the fork passes on each side of the sinuous or zigzag cam $d$, which is secured to and revolved by the wheel F; and since the cam $d$ is of the form of a short hollow cylinder, the ends of which are scalloped or serrated, the depression of one end being opposite the projections of the other end and corresponding with each other in magnitude and form, so that notwithstanding the unevenness of the ends they are parallel to each other, and fitting between the forks of the arm, it is plain that the latter must traverse the sinuosities or notches of the former, and in so doing it will be vibrated, together with the discharger to which it is attached, and the rapidity of the vibrations will be proportionate to the velocity with which the cam is revolved and the number of its serrous or sinuous notches.

While the trough C or the bottom A′, as the case may be, is moving in one direction the seed on one side of the stops $b$ in each compartment is pushed over the holes $c$, through which it drops into the furrow, while on the opposite side of the stops a space or vacuum is formed which favors the descent of the seed from the hopper, and it accordingly runs down, and thus is the supply of seed in the trough constantly replenished. The dark lines $b$, Fig. 6, show the position of the stops when the discharging-trough, Figs. 1 and 2, or vibrating bottom, Figs. 5 and 6, is at one extreme of its motion. The dotted lines $b'$ show their position at the other extreme, and the space between the dark and dotted lines indicates the extent of the motion and the quantity of seed discharged at each movement to the right or left. The rapidity and length of the vibrations of the discharging apparatus, and of course the quantity of seed discharged, can be varied almost infinitely by varying the size of the cam and the number and depth of its notches. The arrows $m$, Fig. 6, indicate the direction of the currents of seed running from the hopper into the trough when the stops or pushers are in the position represented by the dark lines $b$, and the arrow $n$ shows the end of the compartments whence the seed is running through the apertures $c$. The dotted arrows $m'$ and $n'$ show the direction of the several currents into and out of the different compartments of the discharging-trough when the stops are in the position represented by the dotted lines $b'$. When the bottom A′ is movable, as represented in Figs. 5 and 6, the arm D is bent and passes through a slit, $d'$, in the bottom of the trough, and connects with the said bottom A′ for the purpose of vibrating it. The slit $d'$ is too narrow to permit the seed to fall through it. Two or more hoppers with suitable discharging apparatus and wheels may be combined together, if such an arrangement should be deemed expedient.

The teeth E are secured to the bottom of the hopper by screws, or otherwise, and are so formed and arranged that one tooth will cover the seed dropped in the drill made by the adjacent tooth on the side toward which it turns the soil. On the upper part of each tooth a funnel, $f$, Fig. 3, is formed to receive the seed from the hopper and guide it to the proper place in the furrow. The number of teeth may be increased or diminished at pleasure, as may also the distance between them, and the discharge of the seed can, if desired, be rendered intermittent by changing the form of the cam so as to produce but one or two vibrations of the discharger during a revolution of the wheel. This arrangement would adapt the machine to planting corn or other seeds in hills. To prevent the teeth from slipping forward in case they should suddenly come out of the ground, as in crossing a furrow or ditch, and thus letting the hopper drop down backwards, the chains $s$, Fig. 2, pass from the shafts to the upper edge of the hopper, where they are hitched upon hooks placed there for that purpose. These stay-chains can be hooked up or let out for the purpose of altering the position of the hopper and teeth.

The hopper is connected with the shafts H by the hinge-joints $e$ $e$, by which arrangement the teeth are left free to rise and fall to accommodate themselves to the inequalities of the ground, and may be raised from the ground entirely, to carry them over stones or other obstructions in their path, by simply raising the handle; and in case the teeth should accidentally meet a stone or other obstacle in their path this joint admits of their upper ends being inclined forward and depressed so far as to allow the points to slide over such obstacle. The shafts H are made in the usual or in any convenient way, and to them is harnessed the horse or other beast which draws the machine. Near the rear end of these shafts and in any convenient position the wheel F is placed. It is mounted upon an axle, $g$, which turns in suitable bearings, $x$, formed in the shafts. There are three different bearings for this axle arranged in a vertical line, and by raising and lowering it the elevation of the shafts H is increased or diminished. The wheel F is for the purpose of supporting the weight of the rear end of the shafts to keep the hopper and teeth in the right position and to vibrate the discharger by means of a sinuous or zigzag cam, $d$, secured to it in any suitable manner; but this vibration may be effected by other well-known equivalent devices.

What I claim as my invention, and desire to secure by Letters Patent, is—

The combination of the fixed and sliding apertures *a* and *c* with the stops *b*, as herein described, to form passages which are constantly open, and through which the seed may be discharged from the hopper into the drills made by the teeth without being clipped, bruised, or otherwise injured by the operation.

In testimony whereof I have hereunto set my hand, in presence of two subscribing witnesses, this 18th day of December, A. D. 1847.

ALBERT G. BARTLETT.

Witnesses:
Y. BERNARD,
P. H. WATSON.